United States Patent [19]
Miller

[11] 3,899,007
[45] Aug. 12, 1975

[54] INSULATED PIPE ANCHOR ASSEMBLY

[76] Inventor: Randall J. Miller, 1051 Woodside Dr., West, Mobile, Ala. 36608

[22] Filed: Jan. 30, 1973

[21] Appl. No.: 327,906

[52] U.S. Cl. .................. 138/114; 138/149; 285/48
[51] Int. Cl.² .................... F16L 9/14; F16L 59/16
[58] Field of Search ........... 138/103, 105, 112, 113, 138/114, 148, 149; 285/47, 48, 50, 61, 133 R

[56] References Cited
UNITED STATES PATENTS

| | | | |
|---|---|---|---|
| 1,592,175 | 7/1926 | Boyd | 285/48 |
| 2,546,533 | 3/1951 | Williamson | 138/149 |
| 2,930,407 | 3/1960 | Conley | 138/148 |
| 3,168,114 | 2/1965 | Martin | 138/114 |
| 3,351,361 | 11/1967 | Martin | 285/47 |
| 3,642,308 | 2/1972 | Zeile, Jr. et al. | 285/47 |
| 3,747,961 | 7/1973 | Couch et al. | 285/133 |

FOREIGN PATENTS OR APPLICATIONS

| | | | |
|---|---|---|---|
| 1,600,542 | 4/1970 | Germany | 285/48 |

Primary Examiner—Herbert Goldstein
Attorney, Agent, or Firm—James E. Noble; William G. Gapcynski; Lawrence A. Neureither

[57] ABSTRACT

An underground high temperature conduit is intermittently anchored against axial displacement in concrete blocks by means of radially extending metallic anchor plates. The central conduit includes an adjacent insulation layer and a non-continuous reinforced fiber plastic outer casing which is connected through first an insulating flange, and second a metal sleeve to the oppositely disposed sides of the intermittent anchor plates. Surrounding the outer casing at each anchor station is an annular outer housing which extends beyond the width of the concrete block. Additional insulating flanges are placed at the respective conduit end locations. Each insulation flange includes a steel flange plate which faces a reinforced fiber plastic flange plate and is secured by an insulated fastening means through an intermediate asbestos gasket.

3 Claims, 5 Drawing Figures

INSULATED PIPE ANCHOR ASSEMBLY

The invention described herein may be manufactured and used by or for the Government for governmental purposes without the payment of any royalty thereon.

BACKGROUND OF THE INVENTION

1. Field of the Invention

The present invention relates to pipe anchor construction. More particularly the invention relates to intermittently anchored high temperature underground conduit systems which employ insulating flange assemblies for accomplishing the metal-nonmetal conduit connections.

Because these underground conduit systems are subject to variations in temperature, they are also subject to expansion and contraction. Accordingly, it is necessary to provide intermittent expansion joints along the length of conduit. To insure proper allocation of the conduit expansion and contraction, it is necessary to anchor the conduit against longitudinal movement at locations between the expansion joints.

2. Description of the Prior Art

For the most part the prior art has used metallic outer conduit casings such as that described in U.S. Pat. No. 3,168,114 which issued Feb. 2, 1965 to J. L. Martin. The outer metal casing was chosen primarily because of the ability to withstand high temperatures. However, the choice of metallic casings is unattractive from the standpoint of expense, susceptibility to corrosion, and its propensity to expand and contract.

More recently, however, the prior art has gone to non-metallic outer casings for high temperature fluid conduits. This is represented by an anchored high temperature fluid conduit system manufactured by RIC-WIL, Incorporated of Brecksville, Ohio which employs an outer casing of fiberglass reinforced plastic conduit. This is identified in RIC-WIL Drawing No. SKA 4169 E.

In the RIC-WIL reference, however, the non-metallic outer casing is directly bonded to an annularly disposed steel casing at all nonmetallic-metallic connection locations by means of an epoxy resin bond. This type of connection suffers from the disadvantages of high temperature breakdown, consequential leaking, and affords a more limited access to the central high temperature conduit.

It has become conventional in the prior art as represented by the Martin pipe anchor and by U.S. Pat. No. RE 22,988 issued Mar. 16, 1948 to W. S. McLeish to employ metallic anchor plates depending from the central high temperature conduit, extending through the outer casing, and embedded in a surrounding concrete block.

These anchor plates, while providing a rigid anchor means for the conduit system also conduct heat from the high temperature conduit to the outer casing, thereby making the use of a non-metallic outer casing impracticable when using the insulating means and connectors of the prior art.

SUMMARY OF THE INVENTION

The invention solves the aforementioned problems by providing an insulating flange assembly for axially connecting non-metallic casings to metallic casings and/or end plates. This is accomplished in an underground, anchored, high temperature fluid conduit system by employing, at all metal-nonmetal connections, an insulating flange wherein a metallic flange plate is removably connected to a non-metallic flange plate through an intermediate insulating gasket. These insulating flange connections permit the use of non-metallic outer casings without high temperature breakdown and which afford greater accessibility to the central conduit.

Accordingly, it is an object of this invention to provide an insulating flange which permits the use of a non-metallic outer casing for an anchored, high temperature conduit.

It is a further object to provide a rigid anchor for an underground conduit assembly while affording greater access to a central conduit by means of an outer housing and a removable coupling.

These and other objects, advantages, and novel features of the invention will become apparent from the following detailed description of the invention when considered in conjunction with the accompanying drawings wherein:

DESCRIPTION OF THE PREFERRED EMBODIMENT

Figure 1:
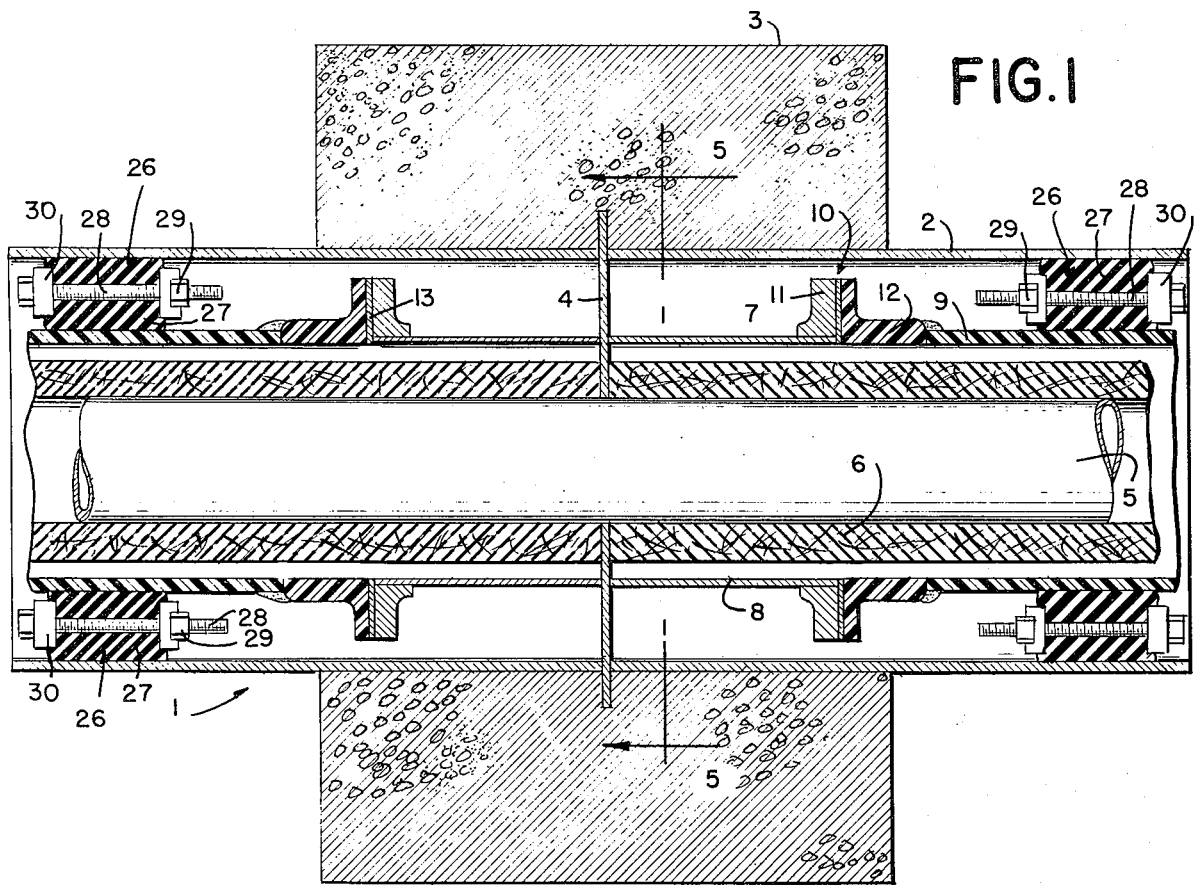
FIG. 1 is a fragmentary side view in section of the underground conduit anchor assembly showing an insulating flange connection means on either side of the anchor plate for connecting the non-continuous non-metallic outer casing pipe with an intermediate metallic sleeve.

Referring to the drawings, more particularly to FIG. 1, a portion of the underground conduit assembly, indicated generally by reference character 1, having an annular housing casing 2, is shown rigidly anchored in a concrete block 3 by means of anchor plate 4 which emanates from the conduit assembly 1 and extends into said concrete block 3.

The conduit assembly 1 includes a central fluid pipe 5 of any suitable high temperature material such as steel. Extending radially outwardly from said pipe and rigidly connected therto are anchor plates 4. These anchor plates are located intermittently along said pipe between expansion joints to prevent axial movement and evenly distribute pipe expansion and contraction among said joints. For conventional high temperature fluid conduits, these anchors are located at approximately 100 foot intervals. The particular interval, however, depends upon the particular materials used and existing temperature gradients.

Immediately surrounding the high temperature pipe 5 on either side of said anchor plate 4 is an annular layer 6 of any suitable insulation material. Surrounding the annular layer of insulation material with an air space 7 therebetween on either side of said anchor plate is a metal sleeve 8. In the preferred embodiment the air space is about one inch deep and the steel sleeve is approximately 8-11 inches in length for conventional 6 inch steam pipe. It will be obvious to one skilled in the art, however, that the particular dimensions of these elements will be dictated by the maximum pipe 5 temperature, type of insulating materials, and maximum outer casing tolerance temperature.

The annular metal sleeves 8 are rigidly connected to opposite sides of an anchor plate 4 by any suitable means although the preferred embodiment favors a continuous annular weld. Longitudinally connected to the outer ends of said steel sleeves are non-metallic annular casings 9 which serve as the outer conduit casing which is continuous outside the concrete block 3 anchor housing. In the preferred embodiment, this non-metallic casing is made of a fiberglass reinforced plastic. Similarly, the invention prefers for all metal surfaces, a sand blasted steel, coated with an inorganic zinc primer in accordance with Military Specification MIL-P-23236 Class III, and an outer vinyl finish coat of a minimum of 8 mils.

Figure 4:
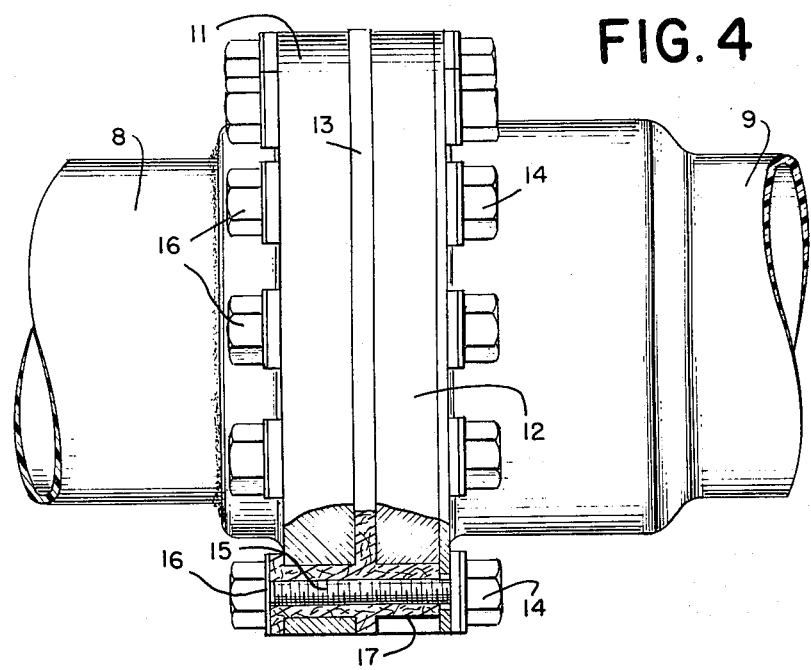
FIG. 4 is an isolated side view, a portion of which is broken away and shown in section of the insulating flange connection for uniting the non-metallic outer casing with the intermediate metallic sleeve.

The metal sleeve 8 non-metallic annular casing 9 connection is accomplished by a removable insulating flange connector assembly indicated generally by reference character 10 and shown in detail in FIG. 4.

The insulating flange assembly includes an annular metal flange 11 connected to the metal sleeve 8, an oppositely disposed non-metallic flange 12 connected to the non-metallic outer casing 9, and an insulating gasket 13 made preferably of asbestos disposed therebetween. These oppositely disposed flanges are connected by nuts 14 and bolts 15 as shown in FIG. 4. The nuts and bolts are insulated from the flanges by means of insulating washers 16 and sleeves 17. Said washers and sleeves can be made of any suitable high temperature insulating material.

Disposed around the conduit assembly 1 is the annular housing casing 2 made preferrably of steel construction and of sufficient diameter to facilitate ready access to the inclosed insulating flange connectors 10. The annular housing casing 2 is rigidly connected (preferably by continuous weld) to opposite sides of the anchor plate 4 and extends in an axial direction outside of said concrete block 3. The outside ends of the annular housing are closed by removable annular casing seals 26 as shown in FIG. 1. The particular casing shown in FIG. 1 is a link-seal which is comprised of a series of interconnected rubber links 27, annularly disposed bolts 28, nuts 29, and pressure plates 30 located at either end of said links. As the bolts are tightened, the rubber links expand to form a completely homogeneous seal between the non-metallic outer casing 9 and the housing casing 2. Although the invention prefers the link seal assembly, other removable casing seals such as those of the threaded variety are contemplated by the instant invention.

Because of the outer housing 2, the removable casing seal 26, and the removable flange connector 10, ready access is provided to the central conduit within the anchor block 3 in a manner not permitted by the prior art.

Figure 5:
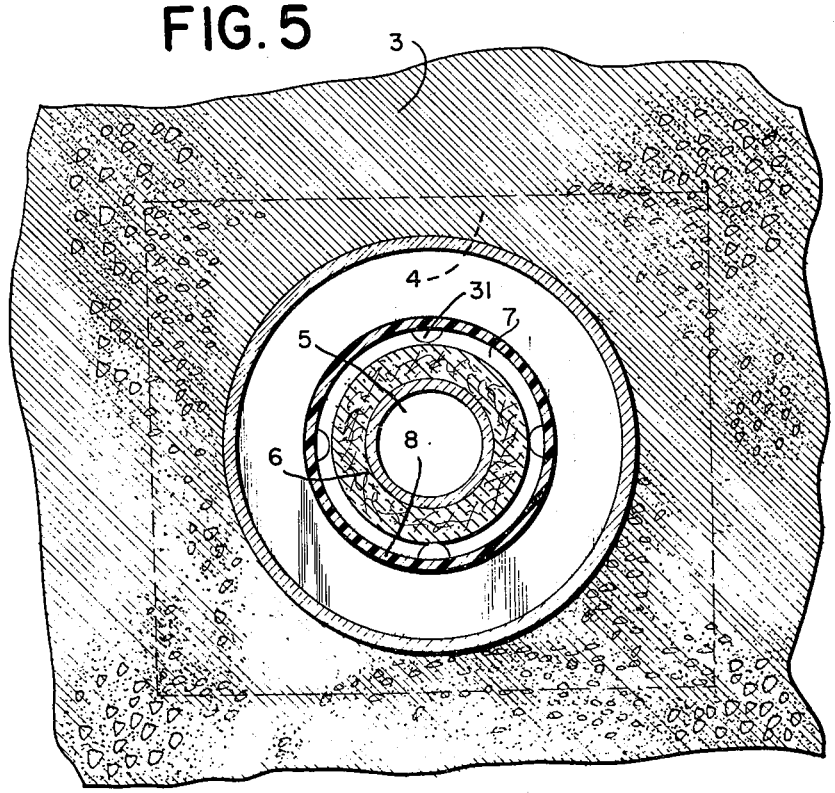
FIG. 5 is a sectional view taken through plane 5—5 as shown in FIG. 1 which shows the anchor plate outline in phantom and the vent and drain holes cut through the anchor plate.

FIG. 5 shows the vent and drain openings 31 which are cut through the anchor plate 4 to facilitate continuous gas and liquid transfer through the air space 7.

Because of the non-metallic annular outer casing 9 it is necessary to provide a similar insulating flange type assembly for the various high temperature conduit end station configurations such as those found in man hole ports or similar access locations. Accordingly, the invention shows conventional end and gland seals in FIGS. 2 and 3 respectively, employing insulating flanges similar to those described above.

Figure 2:
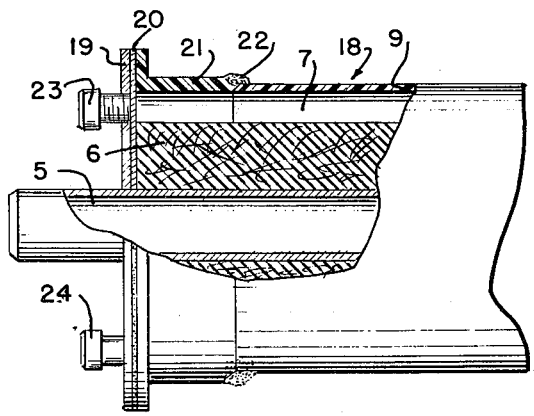
FIG. 2 is a fragmentary side view, parts being broken away and some shown in section, of a conventional metallic end seal employing an insulating flange of the instant invention to insulate the non-metallic outer casing pipe from the metallic end seal.

FIG. 2 shows an end station location 18 of the conduit assembly 1 which includes a steel blind annular flange 19, an asbestos insulating gasket 20, and a non-metallic insulating flange 21. The non-metallic insulating flange is rigidly connected to the non-metallic outer casing 9 by any suitable continuous bonding means as indicated at 22 and bolted to the blind flange 19 with appropriate insulating sleeves and washers as shown in analogous detail in FIG. 4. The blind flange 19 and gasket 20 are drilled and tapped to accomodate the high temperature pipe 5 as well as an upper vent pipe 23 and a lower drain pipe 24 which are included to permit escape of encapsulated gases and condensation accumulation.

Figure 3:
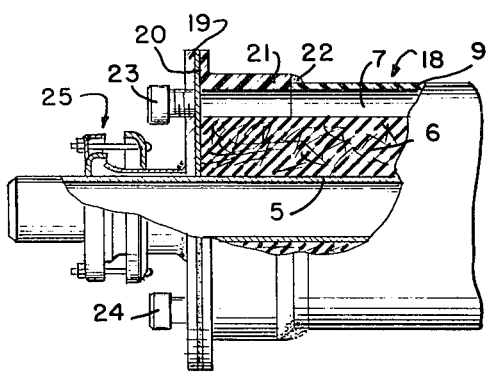
FIG. 3 is another fragmentary side view, parts being broken away and some shown in section of a conventional metallic gland seal employing an insulating flange of the instant invention to insulate the non-metallic outer casing pipe from the metallic gland seal.

Similarly, FIG. 3 shows a conventional flanged or screwed dresser type gland seal indicated generally by reference character 25 mounted about a portion of the high temperature pipe 5 extending beyond the annular steel blind flange 19. As in FIG. 2, the annular flange 19 is bolted through an intermediate asbestos gasket 20 to the non-metallic insulating flange 21. The flange and gasket are similarly drilled and tapped to accomodate the high temperature pipe 5 and the vent and drain pipes respectively.

Although in the preferred embodiments represented by FIGS. 2 and 3, the blind flange emanates directly from said high temperature pipe 5, the invention contemplates an end seal construction which employs a contiguous metal sleeve adaptor similar to that shown in FIG. 1.

In most end seal situations a contiguous metal sleeve is not necessary because the ambient temperature outside the seal is considerably less than that of the air space 7 located around the insulation layer 6. Because of the greater temperature gradient between the high temperature pipe and the ambient air, heat is dissipated more rapidly through the blind steel end flange 19 and, as a consequence, the additional pipe length provided by a contiguous metal sleeve is not required to reduce heat transmission from the high temperature pipe 5 to the outer non-metallic casing 9.

When the high temperature pipe 5 is used to transport steam, the pipe temperature is approximately 340°F and temperature in the air space is an upper limit of approximately 200°F.

The invention in its broader aspects is not limited to the specific details shown and described, and departures may be made from such details within the scope of the accompanying claims without departing from the invention as contemplated and without sacrificing its chief advantages.

I claim:

1. A pipe anchor assembly comprising:
   a. a central conduit for high temperature fluid;

b. an insulating layer surrounding said central conduit;
c. radially extending anchor plates emanating from said central conduit and terminating in an outer anchor means at an anchor station;
d. a metallic sleeve affixed to said anchor plates surrounding said insulating layer and spaced therefrom to define an annular air space, the terminal ends of said metallic sleeve abutting an insulating gasket;
e. an outer metallic conduit;
f. metallic flanges connecting said terminal ends of said metallic sleeve and said insulating gasket;
g. a discontinuous non-metallic casing adjacent said insulating layer having terminal ends spaced from said insulating gasket; and
h. insulating flanges connecting said terminal ends of said non-metallic casing and said insulating gasket.

2. The structure according to claim 1 wherein said discontinuous outer casing is made of a reinforced fiber plastic.

3. The structure according to claim 1 wherein said anchor plates have openings corresponding to said annular air space which facilitate air and condensate passage therethrough, and said insulating gasket is made of asbestos.

* * * * *